United States Patent [19]

Peter et al.

[11] Patent Number: 4,971,367
[45] Date of Patent: Nov. 20, 1990

[54] AIR CONTROLLED ROTARY JOINT COMPENSATOR

[75] Inventors: John H. Peter, Three Rivers; Gerald L. Timm, Schoolcraft; Roger D. Wiedenbeck, Three Rivers, all of Mich.

[73] Assignee: The Johnson Corporation, Three Rivers, Mich.

[21] Appl. No.: 351,465

[22] Filed: May 15, 1989

[51] Int. Cl.$^5$ .......................................... F16L 35/00
[52] U.S. Cl. ........................................ 285/93; 285/95; 285/134; 285/900
[58] Field of Search ................ 285/134, 93, 900, 132, 285/95

[56] References Cited

U.S. PATENT DOCUMENTS

| | | |
|---|---|---|
| 1,896,062 | 2/1933 | Berry . |
| 2,700,558 | 1/1955 | Hieronymus . |
| 3,098,665 | 7/1963 | Smith . |
| 3,874,707 | 4/1975 | Calbins .................................. 285/93 |

Primary Examiner—Dave W. Arola
Attorney, Agent, or Firm—Beaman & Beaman

[57] ABSTRACT

The invention pertains to the method and apparatus of compensating for the axial bearing load forces imposed upon rotary joints conveying a pressurized fluid medium, such as steam, by imposing an axial force on the rotary joint housing proportional to the pressure within the rotary joint by use of a distinctively different pressurized medium than that conveyed by the joint, such as compressed air. An expansible chamber motor capable of imposing an axial force on the rotary joint utilizes compressed air whose pressure is controlled by a sensing and regulating system responsive to the pressure within the rotary joint.

6 Claims, 1 Drawing Sheet

AIR CONTROLLED ROTARY JOINT COMPENSATOR

BACKGROUND OF THE INVENTION

Rotary joints are employed to introduce a heat exchanging fluid medium into a heat exchanger drum, or remove the medium from the drum. Such joints are widely used in the paper and fabric industries for drying a web rapidly moving over the drum surface, and the most common heat exchanging medium utilized is steam. If the drum is used for cooling purposes the rotary joint may convey water.

Typical rotary joints include a housing rotatably mounted upon a nipple concentric to the drum axis of rotation and rotating therewith. Annular seals interposed between the joint housing and the nipple produce a fluid-tight sealing, and as the seals are mounted within the rotary joint housing the seals are exposed to the internal pressure within.

The pressure within the rotary joint tends to bias the seals against the sealing areas and such forces cause the seal pressures to be excessive accelerating seal wear and increasing the seal friction which elevates the seal temperature further increasing wear.

Several approaches have been utilized with rotary joint construction to minimize excessive seal wear due to seal pressure produced by the pressurized medium being conveyed. Internal self-compensating joint constructions use designs wherein the seal faces exposed to the internal pressures substantially counteract each other to reduce seal wear. Also, external self-compensating apparatus is used with rotary joints to impose an axial force on the joint housing itself to reduce seal wear and typical examples of this type of external compensation are shown in U.S. Pat. Nos. 1,896,062; 2,700,558; 3,098,665 and 3,874,707.

In known externally compensated rotary joint systems an expansible chamber motor is axially fixed with respect to the rotary joint housing which is axially displaceable, and the motor is concentrically located with respect to the axis of rotation of the drum nipple and rotary joint housing. The interior of the joint housing directly communicates with the interior of the expansible chamber motor which includes a piston, or piston structure, engaging the housing. As the compensating force exerted on the housing by the expansible chamber motor equals the pressure within the housing times the piston area of the motor the degree of compensation achieved is always proportional to the pressure within the rotary joint housing, and the degree of compensation achieved is a fixed percentage of the housing pressure as determined by the area of the piston within the compensating expansible chamber motor. Thus, due to the "fixed" ratio of compensation it is not possible to vary the compensation once the equipment is installed and the degree of compensation can only be varied by making major mechanical changes, such as by utilizing different sizes of pistons.

Expansible chamber motors of the external types used for compensating rotary joints either use pistons having O-rings for sealing purposes, or the pistons are of a metal diaphragm type. Both piston arrangements create problems. Pistons utilizing O-rings seals limit the use of the compensator with respect to high steam pressures due to the temperature limitations of the material of the O-ring as O-ring materials quickly deteriorate a elevated steam temperatures. Diaphragm type piston structures have limited axial travel due to the inherent nature of construction of the metal diaphragm, and as bearing wear occurs and increased piston movement is required for compensation adjustments must be made in view of the limitations of metal diaphragm pistons.

The concepts of the invention overcome the aforedescribed limitations of known external rotary joint compensators.

It is an object of the invention to provide an external load bearing compensator for rotary joints wherein previous problems encountered with the piston structure of prior compensating expansible chamber motors are eliminated.

Another object of the invention is to provide an external self-compensator for rotary joints utilizing an expansible chamber motor wherein the pressurized medium within the expansible chamber motor is a separate medium from that within the rotary joint, and the expansible pressurized medium is not at an elevated temperature and is non-corrosive.

An additional object of the invention is to provide an external self-compensator for rotary joints wherein &he degree of compensation can be easily and accurately varied for each rotary joint without requiring structural modifications.

Yet a further object of the invention is to provide an external self-compensator for rotary joints wherein high pressure steam is within the joint housing and compressed air is employed to produce the compensating forces upon the rotary joint.

In the practice of the invention the basic structural arrangements previously utilized with conventional externally compensated joints are employed. For instance, the rotary joint includes axially displaceable bearings to seal the housing interior with respect to the rotary drum mounted nipple upon which the housing is mounted. The housing is mounted for limited axial displacement. An expansible chamber motor includes piston structure coaxial with the joint housing axis of rotation and is axially fixed and engages the housing whereby displacement of the piston axially displaces the rotary joint housing.

However, rather than the chamber of the expansible chamber motor directly communicating with the interior of the rotary joint housing as is the usual practice, the expansible chamber motor receives compressed air having a controlled pressure. The compressed air received by the expansible chamber motor is controlled by sensing and regulating means which senses the pressure within the rotary joint by sensing the pressure within the header supplying steam or other pressuring medium to the rotary joint. Accordingly, it will be appreciated that the pressurized medium being supplied to the rotary joint differs from that being supplied to the compensating expansible chamber motor.

A transmitter is used to sense the pressure within the steam header, or within the rotary joint housing. This transmitter controls multiplying and amplification apparatus which regulates the pressure of compressed air supplied to the compensating expansible chamber motor. The multiplying and amplifying apparatus may be very easily regulated to accurately control the pressure within the compensating expansible chamber motor, and in this manner the compensation of each rotary joint may be "customized", i.e. the axial force imposed upon each rotary joint may be very accurately regulated to compensate for the individual characteristics of that particular rotary joint.

As the pressurized medium being supplied to the compensating expansible chamber motor is clean, cool compressed air the expansible chamber piston may include an elastomeric diaphragm to provide one hundred percent sealing between the piston and the cylinder wall of the expansible chamber motor, and the diaphragm may be so constructed as to provide sufficient axial piston movement without necessitating adjustment throughout the entire compensating range as the seals wear. The use of compressed air eliminates the previously experienced corrosion and deterioration of seal material, and piston structure utilizing a high temperature elastomer and fabric will provide effective sealing for a long period of time while permitting extensive piston movement during compensation.

BRIEF DESCRIPTION OF THE DRAWINGS

The aforementioned objects of the invention and the advantages thereof will be appreciated from the following description and accompanying drawings wherein.

DESCRIPTION OF THE PREFERRED EMBODIMENT

Figure 1:
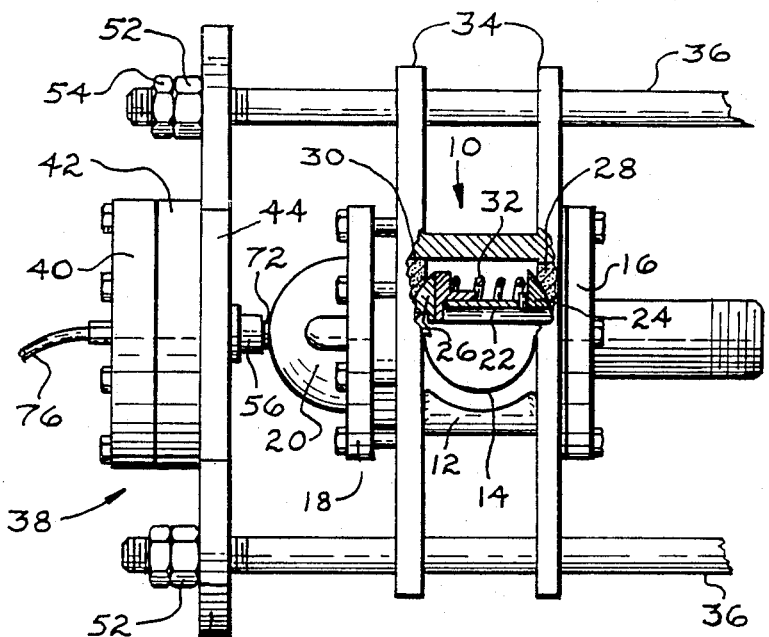
FIG. 1 is a plan view of a typical rotary joint and external compensator installation in accord with the invention, a portion of the rotary joint housing being broken away for purpose of illustration.

A typical arrangement of a rotary joint having an external compensator is shown in FIG. 1, and this arrangement is very similar to that shown in the assignees U.S. Pat. No. 3,874,707.

The rotary joint is generally indicated at 10 and includes a housing 12 having a conduit inlet port 14. The housing includes an inner wall plate 16 attached to the housing by bolts, and at its other axial end the housing is closed by the outer wall plate 18 also attached to the housing by bolts. The housing wall 18 also includes a syphon housing 20 whereby syphon structure, not shown, may communicate with the housing 12.

Internally, the housing 12 is mounted upon the rotating tubular nipple 22 which is coaxially connected to the rotating heat exchanger drum for rotation therewith, not shown, receiving the pressurized medium introduced into the rotary joint 10 through the inlet port 14. Sealing structure is located within the housing 10 interposed between the nipple 22 and the housing and such seals are of an annular configuration including collars 24 and 26, at least one of which may be axially displaceable on the nipple, and an annular sealing ring 28 is located between collar 24 and inner wall 16 while the annular seal 30 is located between collar 26 and outer wall 18. A compression spring 32 biases the collars 24 and 26 into engagement with the associated sealing ring and sealing surfaces exist between the collars and their associated sealing rings, and between the sealing rings and their associated housing end wall plates.

As will be appreciated, as the housing sealing structure is directly exposed to the pressurized medium, usually steam, within the housing 10 significant internal pressures exist within the housing that are also imposed upon the sealing structure causing the engaging surfaces of the seals and collars to firmly engage.

The rotary joint housing 10 is supported upon a pair of radially extending arms 34 which have holes at their outer ends for slidable association with the support rods 36 which are attached to fixed support structure adjacent the rotary drum, not shown. The support rods 36 are threaded at their outer ends for providing support for the compensating external expansible chamber device or motor 38 as later described. The aforedescribed rotary joint structure is known and fully described in the assignees U.S. Pat. No. 3,874,707.

Figure 2:
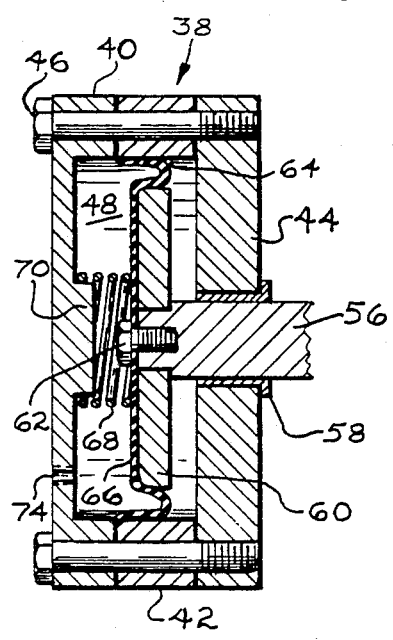
FIG. 2 is an enlarged, diametrical, elevational sectional view of the compensating expansible chamber motor of the invention.
Figure 3:
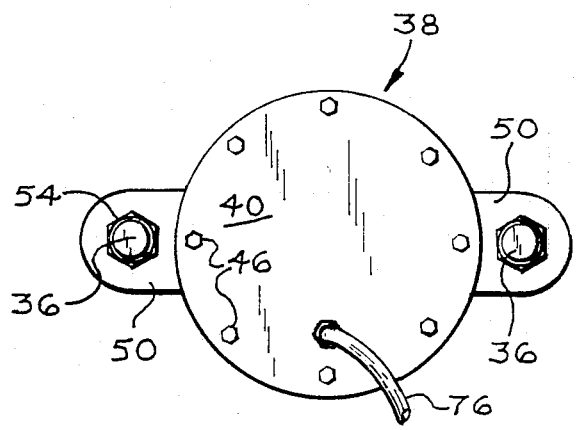
FIG. 3 is an end view of FIG. 1 as taken from the left thereof.

The construction of the compensating expansible chamber motor 38 is best appreciated from FIG. 2. The compensator comprises an expansible chamber motor 38 having a housing defined by an outer cover plate 40, an annular spacer plate 42, and a body plate 44. These three plates are maintained in assembled relationship by eight threaded bolts 46 having heads bearing against the cover plate 40, and threads which thread into holes defined in the body plate 44. As will be appreciated from FIG. 2, plates 40 and 42 are each provided with an internal cylindrical surface of equal diameters to define the cylindrical chamber 48 of the compensator motor.

The plate 44 includes a pair of radially extending arms 50 having threaded nuts 52 affixed thereto and by the use of lock nuts 54, the axial position of the compensator motor 38 to the support rods 36, and to the joint housing 12, can be accurately determined and maintained. It is to be appreciated that the rotary joint arms 34 are supported upon the support rods 36 for axial displacement of the housing 12 relative thereto, while the compensator 38 is axially fixed with respect to the support rods and the joint housing.

The compensator 38 includes a piston 56 axially extending through the center of the body plate 44 through a bushing 58, and internally, a circular rigid head 60 is mounted upon the piston by bolt 62. A flexible diaphragm 64 formed of a high temperature resistent elastomer and fabric, such as commercially known under the trademark Viton, is mounted upon the piston head by a lip retainer 66 held in position by the bolt 62, and at its outer region the flexible diaphragm is received between the joining surfaces of the cover plate 40 and the spacer plate 42 so that the outer circumference of the diaphragm is sealed with respect to the compensator housing. A compression spring 68 circumscribing to the boss 70 formed on the cover plate bears against the lip retainer 66 to bias the piston head and piston to the right, FIG. 2., into engagement with the anvil 72 defined on the rotary joint syphon housing 20.

An inlet port 74, FIG. 2, is formed in the cover plate and is tapped with a ⅛" pipe thread for receiving the air supply tube 76, FIG. 1.

Figure 4:
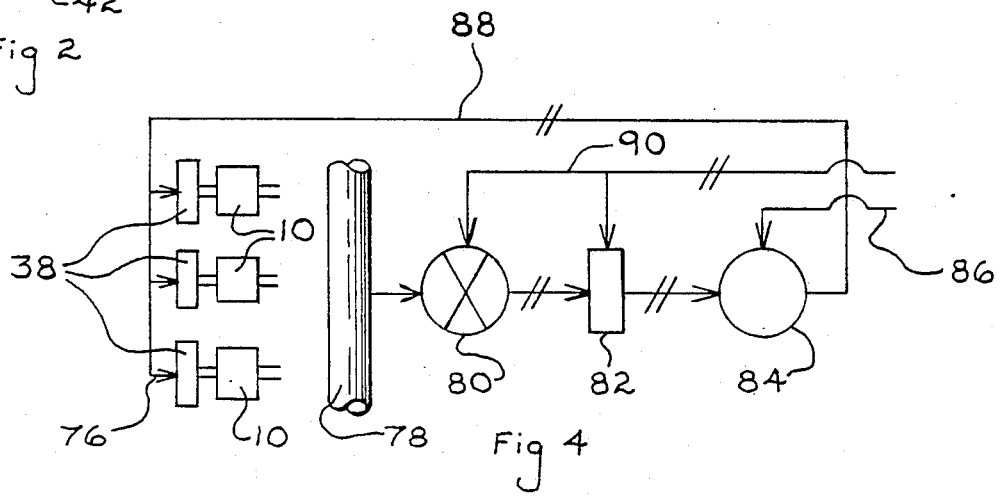
FIG. 4 is a schematic diagram illustrating the basic components of the apparatus used to practice the invention.

With reference to FIG. 4, the circuitry and operation of the external rotary joint bearing compensator of the invention will be explained.

The pressurized medium, such as high temperature steam, supplied to the rotary joint 10 through the port 14 is supplied from a header 78. A transmitter 80 is in communication with the header 78 sensing the pressure within the header. The transmitter 80 produces a signal proportional to the pressure within the header and this signal is transmitted to the multiplier 82. The multiplier 82 in turn produces a signal fed to the amplifying relay 84 which is in the form of a compressed air regulator receiving compressed air through supply conduit 86 The pressure of the compressed air from the regulator 84 is determined by the signal received from the multiplier 82, and the regulated compressed air is supplied through conduit 88 to the compensator expansible chamber motor 38 through tube 76, and accordingly, the pressure within the compensator chamber 48 will be determined by the regulator 84 and the axial force imposed on the rotary joint housing 12 by the piston 56 is accurately determined by the value of the compressed air within the compensator 38. In FIG. 4 a plurality of compensators 38 are shown as being controlled in parallel by the compressed air from regulator 84, and it will be appreciated that a plurality of rotary joints 10 may be controlled by a single regulator or each rotary joint may have its own regulator.

It will be appreciated from the above description that the compressed fluid medium used to control the compensator expansible chamber motor 38 is separate and distinct from the pressurized fluid medium within the header 78 and joint 10. As the preferred control pressurized medium is compressed air, and as compressed air will be relatively cool, no significant deterioration of the flexible diaphragm 64 will occur due to the compensator medium, and as will be appreciated from FIG. 2, the "fold" of the diaphragm may be significantly long to permit sufficient piston travel to accommodate the entire range of movement required for compensation as the seals wear without necessitating adjustment of the compensator upon the support rods 36.

In the disclosed control circuitry shown in FIG. 4 the transmitter 80 and multiplier 82 are air controlled, and compressed air is supplied to the transmitter and multiplier through the compressed air conduit 90. The transmitter 80 may be a FOXBORO pressure transmitter and the multiplier may also be a FOXBORO pneumatic computer multiplier while the amplifying relay regulator may be a standard model manufactured by Moore Products. As the transmitter 80 receives a steam pressure signal from the header, the transmitter produces an air pressure signal corresponding to the steam pressure and the pneumatic computer multiplier 82 produces an air pressure signal proportional to the amount of compensation force needed. This air pressure signal from the multiplier 82 is then supplied to the amplifying relay regulator 84 where it is boosted to provide the necessary pressure for the compensator 38. While, in the enclosed embodiment, the sensing and control of the air pressure supplied to the compensator utilizes air controlled devices, it will be appreciated that electronically operated transmitter and multiplier devices may be used and the amplifying relay would constitute an electrically controlled compressed air regulator.

The computer multiplier 82, or transmitter 80, or both, include readily adjustable controls so that the air pressure supplied to or through the conduit 88 may be very accurately regulated merely by adjusting such controls. Thus, the practice of the invention permits the amount of load bearing compensation of the rotary joints to be very accurately regulated to accommodate the particular conditions present.

To obtain maximum seal ring life the force exerted on the seal rings 28 and 30 and the temperature of the seal rings must be maintained at a minimum. However, the axial sealing force on the seal rings must be sufficient to produce effective sealing. Excessive force on the seal rings causes faster than normal wear and high temperature causes rapid deterioration. The axial force on the seal rings is determined by the pressure of the medium within the rotary joint, and the temperature of the seal rings is determined by both the temperature of the medium within the joint and the heat generated by contact between the seal rings and the associated collars and plates. While the temperature of the medium within the joint cannot be regulated, the degree of seal friction can be controlled by the compensation provided by the practice of the invention, and by regulating the output signals of the transmitter and multiplier the degree of axial compensating force imposed on a rotary joint may be very accurately regulated and varied if desired. Such "customized" adjustment has not been previously available with either external or internal compensated rotary joints.

By utilizing compressed air as a control pressurized medium for the compensator expansible chamber motor problems previously encountered due to condensate within the expansible chamber motor compensating motor are eliminated, the seal structure within the compensator is not exposed to high temperatures, and sufficient axial piston movement can be achieved with 100% effective sealing between the piston and chamber by the use of the diaphragm is present as compared to the limited metal diaphragm movement of prior art devices, and with the practice of the invention the ability of an exteriorly compensated rotary joint to handle nonconcentric installations is maintained while simultaneously providing a degree of control of compensation not heretofore achievable.

It is appreciated that various modifications to the inventive concepts may be apparent to those skilled in the art without departing from the spirit and scope of the invention.

We claim:

1. A rotary joint bearing load compensating system for rotary joints in communication with conduits transferring a pressurized heat exchanging medium with respect to a rotating drum having a nipple attached thereto for rotation therewith wherein the joint includes a housing having a longitudal axis, said housing being concentrically mounted upon said nipple and communicating therewith sealing bearings within the housing concentric with the axis utilizing axial load forces for sealing the medium within the housing, a support supporting the housing adjacent the drum, axially extending guides defined on the support permitting axial housing displacement and an expansible chamber device mounted adjacent to the housing having an axially moveable element engaging the housing for selectively axially displacing the housing to vary the axial load on the sealing bearings, the improvement comprising, pressure sensing means sensing the pressure of the heat exchanging medium to produce a control signal proportional to the pressure of the heat exchanging medium, means supplying a pressurized control fluid medium separate from the heat exchanging medium, pressure regulating means operated by said control signal having an inlet in communications with said pressurized control medium and an outlet in communication with the expansible chamber device providing a pressurized control medium for the device having a pressure as determined by said control signal to produce an axial load on the sealing bearings proportional to the pressure of the heat exchanging medium.

2. In a rotary joint compensating system as in claim 1, said pressurized control fluid medium comprising compressed air.

3. In a rotary joint compensating system as in claim 2, said pressure regulating means operated by said control signal comprising air pressure regulating means.

4. In a rotary joint compensating system as in claim 3, said air pressure regulating means including an amplifier amplifying the signal from said pressure sensing means.

5. In a rotary joint compensating system as in claim 2, the expansible chamber device including a cylinder having an axis, a piston assembly axially displaceable within said cylinder, said piston assembly including a flexible diaphragm.

6. In a rotary joint compensating system as in claim 5, said cylinder including a cylindrical wall, said piston including a pressure head within said cylindrical wall, said diaphragm including a central region engaging said pressure head and a periphery affixed to said cylindrical wall.

* * * * *